(No Model.)
F. DRIFFILL.
HARNESS.
No. 398,589. Patented Feb. 26, 1889.
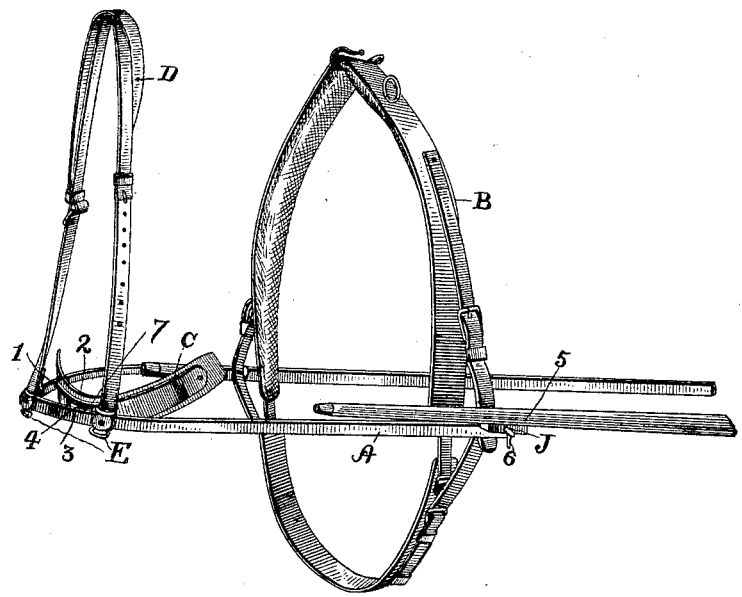
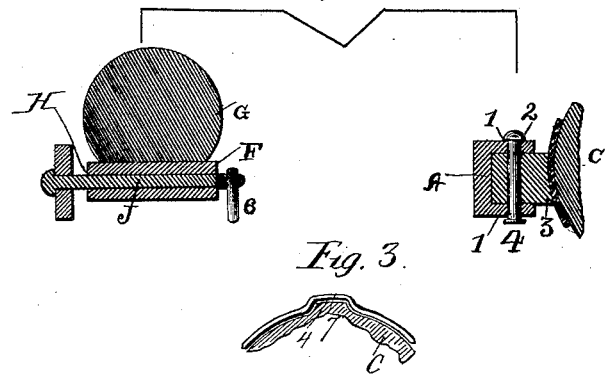
WITNESSES,
Edwin L. Yewell
Marcus B. May
INVENTOR,
Frederick Driffill,
John G. Manahan,
Attorney.

UNITED STATES PATENT OFFICE.

FREDERICK DRIFFILL, OF STERLING, ASSIGNOR TO THE EUREKA COMPANY, OF ROCK FALLS, ILLINOIS.

HARNESS.

SPECIFICATION forming part of Letters Patent No. 398,589, dated February 26, 1889.

Application filed October 18, 1888. Serial No. 288,519. (No model.)

*To all whom it may concern:*

Be it known that I, FREDERICK DRIFFILL, a citizen of the United States, residing at Sterling, in the county of Whiteside and State of Illinois, have invented certain new and useful Improvements in Harnesses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements in harnesses and the mode of attaching the same to the thills of the vehicle.

The object of my invention is to dispense with the usual traces and breeching and its attendant parts involved usually in the backing or holding back of a vehicle. By attaching the animal to the thills at a point upon the latter about opposite to the back-band the thills are utilized for draft, for backing, and for holding back the vehicle. This not only simplifies the harness and dispenses with the singletree, but it also greatly reduces the labor and trouble of hitching and unhitching the animal.

My invention further consists in the conformation of the draft-pad, by which the pressure in drawing is borne mainly upon the shoulders of the horse, the object being to avoid pressure under the horse's throat, which injuriously affects the latter and produces coughing.

My invention further consists in centrally pivoting in a substantially-horizontal plane the draft-bow, which connects said pad with the thills, so that the oscillatory movement of the horse will expend itself at said pivotal point, and thus allow the draft-pad to remain in constant contact with the shoulders of the beast.

In the usual construction involving the use of the singletree the oscillation of the latter, communicated thereto by the alternate movements of the horse's shoulders, extends through both traces and across the breast of the horse in a species of sawing or rubbing movement.

As my invention consists merely in the method of draft and the attachment of the draft and holdback apparatus to the thills of the vehicle, I do not deem it necessary to show or describe the residue of the harness any further than will be essential to a clear understanding of the construction and operation of my invention.

In the drawings, Figure 1 is a perspective of the thills of a vehicle and so much of the harness as is involved in my invention in the attachment of the animal to the thills. Fig. 2 shows enlarged details of the side attachment and the front pivotal connection of the draft-bow. Fig. 3 is a detail of a portion of the draft-bow A and of the breast-pad C.

A is a metallic draft-bow placed in a horizontal position astride the shoulders of the horse, with its free ends extending to the rear to a point about opposite the back-band B. Between the front end of the bow and the draft or breast pad C there is interposed a horizontal pivot connecting said bow to the pad centrally.

The pivotal connection between the breast-pad C and bow A is constituted of jaws 1 1, formed horizontally on the bow A. In the center of the jaws 1 is formed the vertical pivot-seat 2. A forward projection or tongue, 3, is formed on the front side of the metallic portion of the pad C and adapted to be projected between the jaws 1. The tongue 3 is also furnished with a vertical hole, and when said tongue is placed between the jaws 1 a vertical bolt or pivot, 4, is passed down through said jaws and tongue and furnishes a pivot or joint for the necessary lateral oscillation of the pad C. The usual supporting-strap, D, which is suspended on the neck of the animal, is suitably attached to the bow A by means of clip E.

A short metallic box, F, is rigidly fastened to the under side of the thills G at a point on the latter opposite the back-band B. In the box F is centrally formed a transverse hole, H. On the outside of each of the rear ends of the bow A are formed draft-pins J. The pins J are projected horizontally outward at right angles with the adjacent part of the bow A and are adapted to be inserted in the opening H in the box F. The outer end of the pin J is provided with the central vertical slot, 5, in which is pivotally seated the key 6. The upper end of the key 6 projects slightly above the pin J when said key is at right angles to said pin; but the main portion of said key and the weight thereof are below said pin. The slot 5 extends sufficiently inward to permit the lower end of the key 6 to be drawn up horizontally and in line of direct projection of pin J, in which position the upper end of the key 6 is folded back within said pin. The pin J can then, with the key 6 projecting in line thereof, be readily passed through the opening H in the box F. When the pin is projected through said box sufficiently, the key 6 is turned downward into a perpendicular position, and as both ends of said key in this position project over the outer walls of the hole H the key 6 prevents the casual withdrawal of said pin from said hole. The most of the weight in the key 6 being below its pivotal point, said key hangs by its gravity in a vertical position.

In order to detach the harness from the vehicle, it is necessary only to raise the lower end of the key 6 outwardly to the plane of the pin J, when the latter can be readily withdrawn by springing said bow, the thill, or both.

The rear ends of the bow A are attached in any suitable manner near to the back-band B.

The breast-pad C has a metallic front, in which is formed the central forwardly-projecting semicircular recess 7, intended to avoid any pressure from said pad over the wind-pipe of the animal. As the pressure of the pad is necessary only near its ends upon the shoulders of the animal, there is not any pressure needed centrally under the animal's neck.

The advantage of my invention consists not only in the facts that the harness is very much abridged and the labor of attaching and detaching the horse is very much reduced, but the usual slack necessary between the breast-collar and breeching in order to permit the necessary action of the animal's hind legs is avoided in this construction. In the ordinary method involving breeching, the drawing being at one end of the animal and the holding back at the other, when the vehicle strikes an obstruction its movement is suddenly checked until the traces become sufficiently taut to draw it over the obstruction. In descending the latter the vehicle takes a lurch forward, checked only by the engagement of the breeching with the hams of the animal. Thus, in crossing projections on the street—such as an ordinary village-crossing—the occupant of the vehicle experiences a backward jar, to be succeeded by a forward one. In my invention, there being no breeching used, and the drawing and holding back being from the same point—to wit, the box F—there is, therefore, no necessity for the loose hitch to accommodate the movements of the hind limbs of the animal. The thills are readily attached to the bow A, so as to preclude any lost motion between the animal and the vehicle, and the jars aforesaid of the latter are therefore avoided.

My invention, so far as the method of attaching the bow A to the pad C is involved, is equally applicable to the use of full-length traces when desired, and in that construction the usual oscillating whiffletree may be omitted and the traces attached directly to any fixed part of the vehicle, the necessary oscillation being provided in the pivot of the pad C.

In the ordinary use of a breast-collar with traces attached to the usual singletree, there is with every movement of either of the horse's shoulders somewhat of a sawing motion of the breast-collar across the breast of the animal. This results from the fact that the breast-collar draws from each end thereof, and such draft with each movement of the horse's fore legs alternates from one extremity to the other of the breast-collar. In my invention, on the contrary, the pushing force of the animal is always communicated from the breast-pad C centrally to the connecting attachment A. Consequently in the alternate movements of the horse's shoulders there is no shifting of the draft-point from one side of the animal to the other, and therefore none of said lateral sawing.

What I claim as my invention, and desire to secure by Letters Patent of the United States, is—

1. In a harness, the combination of the pad C, provided with the forwardly-projected tongue 2, the bow A, provided with rearwardly-extending jaws 1 1, and the vertical bolt 4, substantially as shown, and for the purpose described.

2. In combination with the thills G, provided with box F, having opening H therein, the bow A, provided with pin J, and the pad C, centrally pivoted to said bow, substantially as shown, and for the purpose described.

3. The combination of the pad C, provided with tongue 3 and the recess 7, the bow A, supported at its front and rear ends, substantially as shown, and provided with jaws 1 1, bolt 4, and means, substantially as shown, for attaching the rear ends of said bow to the vehicle, for the purpose specified.

In testimony whereof I affix my signature in presence of two witnesses.

FREDERICK DRIFFILL.

Witnesses:
JOHN G. MANAHAN,
EDGAR G. BAUM.